United States Patent [19]
Parker

[11] 3,916,093
[45] Oct. 28, 1975

[54] SIGNAL IDENTIFIER FOR A SIGNAL-SEEKING TUNING SYSTEM

[76] Inventor: Louis W. Parker, 2408 Sunrise Key Blvd., Fort Lauderdale, Fla. 33304

[22] Filed: Apr. 29, 1974

[21] Appl. No.: 464,877

[52] U.S. Cl. ................ 178/5.8 A; 325/437; 325/471
[51] Int. Cl.$^2$.... H04N 5/60; H04B 1/26; H04B 1/32
[58] Field of Search ......... 178/5.8 R, 5.8 AF, 5.8 A; 325/470, 472, 473, 437, 416, 422, 420, 388, 347, 471; 334/16, 18, 13, 21, 26

[56] References Cited

UNITED STATES PATENTS

| | | | |
|---|---|---|---|
| 3,553,379 | 1/1971 | Boomgaard | 325/470 |
| 3,610,817 | 10/1971 | Bridgewater | 178/5.8 |
| 3,632,864 | 1/1972 | Evans | 178/5.8 |
| 3,633,111 | 1/1972 | Smith | 325/470 |
| 3,737,565 | 6/1973 | Ma et al. | 178/5.8 |
| 3,737,787 | 6/1973 | Wolfram | 325/470 |
| 3,766,483 | 10/1973 | Wolfram | 334/16 |

*Primary Examiner*—Robert L. Griffin
*Assistant Examiner*—R. John Godfrey
*Attorney, Agent, or Firm*—Elliott I. Pollock

[57] ABSTRACT

An intercarrier television receiver is provided with a motor-driven signal seeker coupled to the tuner of the receiver and operative to continuously tune the receiver until stopped by a control signal. The television signal is identified by the generation of a control signal using the intercarrier frequency across a tuned circuit within the receiver. To eliminate spurious control signals resulting from image frequency heterodyning, the comparative frequencies of the video IF and sound IF signals are monitored, and the control signal is rendered inoperative upon detection of a reversal of the normal comparative frequencies of the video IF and sound IF signals. The system further includes means for muting the picture- and sound-producing components of the receiver until the signal seeker has tuned the receiver to a point of correct signal reception.

16 Claims, 3 Drawing Figures

SIGNAL IDENTIFIER FOR A SIGNAL-SEEKING TUNING SYSTEM

BACKGROUND OF THE INVENTION

The present invention is concerned with signal-seeking tuning systems for use in television receivers, and is more particularly concerned with a system for identifying a television signal and providing a control signal to a motor-tuned station selector in an intercarrier television receiver for selectively interrupting the operation of a signal-seeker at points of correct tuning in a predetermined television frequency spectrum.

Signal-seeking tuning systems for use in television receivers have been suggested heretofore; for example see Ma et al U.S. Pat. No. 3,737,565 issued June 5, 1973, for "Signal Detector for a Signal-Seeking Tuning System." Such systems. commonly employ a motor-driven signal seeker which is connected to the tuner of a television receiver, and which is energized to commence a continuous variation in the tuning of said receiver over a predetermined television frequency spectrum, in response to momentary actuation of a "start" switch forming a portion of the system. The signal seeker continues its tuning operation until a point of correct frequency reception has been achieved, corresponding to the frequency of a transmitted television signal in the area of reception having a signal level sufficiently high to be properly reproduced by the receiver, at which time the receiver generates a control signal which functions to deenergize the motor-driven signal seeker to stop tuning of the receiver. The same type of general operation may be achieved, moreover, by using voltage-controlled tuners employing varactor diodes, with a progressively-variable voltage generator being used instead of a scanning motor. All such known systems constitute " signal seekers" within the meaning of the term as employed herein.

During a continuous tuning operation of the type described above, points of tuning will be achieved where a control signal, operative to stop the signal seeker, will be generated by image frequency heterodyning rather than by the reception of proper signal transmissions. The art has recognized this problem and efforts have been made to devise circuits which will distinguish between correct control signals resulting from the reception of a proper television transmission, and incorrect control signals which have resulted from image frequency heterodyning. The theories upon which these prior circuits have been based have varied, with the result that the circuits have achieved image frequency rejection with varying degrees of reliability. As a general matter, however, prior art circuits have become increasingly reliable to achieve image frequency rejection only at the expense of increasingly complex and costly circuit configurations.

The present invention is intended to obviate these problems in the prior art by the provision of a signal identifier, for use in a signal-seeking tuning system, which is far simpler than signal identification circuits suggested heretofore, but which nevertheless achieves completely reliable operation and rejection of improper control signals resulting from image frequency heterodyning.

SUMMARY OF THE INVENTION

In accordance with the present invention, an improved signal identification circuit is provided which achieves, in a highly simplified but completely reliable fashion, four main functions, i.e., (a) it identifies a television signal among various other signals, (b) it provides a control signal to a signal seeker such as a motor-driven station selector in a television receiver operative to interrupt operation of the signal seeker when a point of correct tuning of the identified signal has been achieved, (c) it disables or mutes the audio and video portions of the receiver over the entire tuning band except at points of correct tuning, and (d) it eliminates spurious control signals at points during the tuning operation where image frequencies would normally appear. While performing all the above functions, the system is comparatively insensitive to noise pick up and other signals not associated with television.

In achieving certain aspects of the operation discussed above, the present invention makes use of principles and circuits described in my prior U.S. Pat. No. 3,686,430 issued Aug. 22, 1972, for "Muter for Solid State Television Receivers," the disclosure of which is incorporated herein by reference. This earlier circuit, which is also employed in the system of the present invention, includes a muter arrangement for intercarrier television receivers provided with an intercarrier sound system, which is operative upon reception of picture carrier and sound carrier signals, spaced from one another by an intercarrier frequency, to supply video signals via a first controllable circuit to picture producing means in the receiver, and to supply, via a second controllable circuit, frequency modulated sound signals to a sound producing means in the receiver. The controllable circuits are transistorized, normally function to prevent the coupling of video and audio signals, but are rendered operative to achieve such signal couplings in response to generation of a control signal. The control signal is in turn generated by connecting a tuned circuit to the intercarrier sound system of the receiver, which circuit is sharply tuned to the intercarrier frequency and operates, upon reception by the receiver of picture carrier and sound carrier signals properly spaced from one another by the intercarrier frequency, to provide an AC signal at the intercarrier frequency. The AC signal which thus appears across said tuned circuit is rectified, accumulated in a capacitor, and then used to control the conduction of a transistor circuit forming part of a circuit which selectively produces a DC control signal operative to control the operating states of the aforementioned controllable coupling circuits thereby to control the muting operation of the receiver.

The arrangement summarized above, and described in further detail in my prior U.S. Pat. No. 3,686,430, is employed in the present invention to produce a control signal which functions to selectively interrupt the scanning operation of the signal seeker, and which simultaneously terminates the video and sound muting operations. The circuit is modified, however, to incorporate a further control circuit operative to determine whether the intercarrier frequency signal appearing across the aforementioned tuned circuit represents the achievement of a point of correct tuning in the receiver, or whether it is a spurious signal resulting from image frequency heterodyning; and the circuit modification employed to achieve this further function is, in itself, simple and inexpensive to provide, but nevertheless achieves completely reliable operation.

The image frequency rejection circuit employed in the present invention is based upon the fact that, when image frequency heterodyning occurs, the comparative frequencies of the video and sound IF signals are the reverse of the comparative frequencies which those IF signals achieve in the frequency spectrum upon proper reception. The modified circuit of the present invention accordingly includes means for monitoring a parameter which is indicative of the comparative frequencies of the video IF and sound IF signals in the receiver. The parameter which is monitored in the preferred embodiment of the invention to be described hereinafter constitutes the modulation which appears on the intercarrier frequency signal appearing across the aforementioned tuned circuit. More particularly, when the intercarrier frequency appearing across the tuned circuit is found to carry an amplitude modulation at the frequency of the sync signals, this is indicative of a reversal in the normal comparative frequencies of the video IF and sound IF signals generated by heterodyning action within the receiver, and corresponds to a condition wherein the intercarrier frequency appearing across the aforementioned tuned circuit has resulted from image frequency heterodyning rather than from the reception of properly spaced picture and sound carrier signals.

In accordance with the present invention, therefore, when an amplitude modulation at the sync frequency is present on the intercarrier frequency appearing across the aforementioned tuned circuit, the amplitude modulation is employed to render control signal inoperative to interrupt the operation of the signal seeker and muting circuits, e.g., by control the magnitude of the control signal and/or its polarity.

In another form of the invention, an additional signal is obtained from the sound intermediate frequency to help in the operation of the image frequency rejection, and to define more accurately the correct point of tuning.

BRIEF DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENTS

Figures 1, 2:
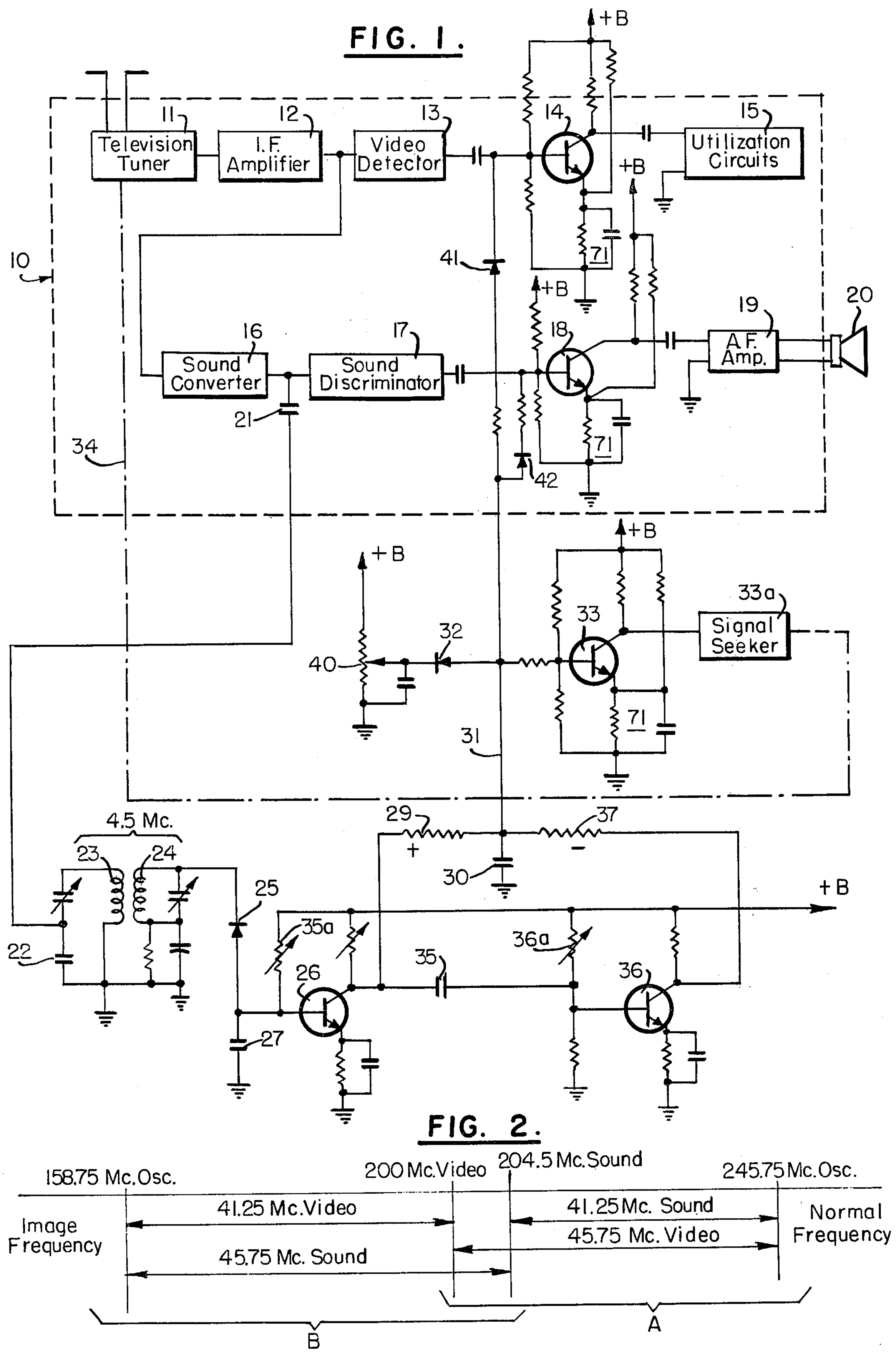
FIG. 1 is a circuit diagram of a signal identifier and associated television circuit constructed in accordance with the present invention.
FIG. 2 is a diagrammatic representation of the principle upon which the image frequency rejection circuit of the present invention is based.

Referring initially to FIG. 1, various conventional portions of an intercarrier television receiver are segregated by broken line 10. These parts of the receiver include a television tuner 11 which includes an RF amplifier and frequency converter stage, a video IF amplifier 12, a video detector (and amplifier) 13, and a controllable coupling circuit 14 for selectively coupling video signals from the output of detector 13 to utilization circuits 15, i.e., the picture tube, related amplifiers, etc. The output of IF amplifier 12 is further coupled to a conventional converter circuit 16, the output of which is coupled via an FM discriminator 17 and a further controllable coupling circuit 18 to audio amplifier 19 and speaker 20. It will be understood that the general arrangement of receiver 10 has been simplified for ease of understanding, and that it is customary to provide various auxiliary components and circuits additional to those specifically illustrated and described; by inasmuch as such additional circuits are conventional, and are not necessary to an understanding of the present invention, no detailed illustration or description of them will be given.

The output of sound converter 16 is also connected via a capacitor network 21, 22 to tuned circuits 23, 24 which are separate from the intercarrier sound system of receiver 10. Capacitor 21 has a comparatively low parameter value, in the order of 10 mmf, to avoid its affecting the operation of sound converter 16, and feeds to ground through a larger capacitor 22 having a capacitance of, for example, 100 mmf. The receiver operation is based upon the fact that, in the United States, television signals are transmitted on two carriers which are spaced from one another by 4.5 MC (the so-called intercarrier frequency); and, in tuning the receiver over a predetermined television frequency spectrum, when two such properly spaced carrier signals appear at proper points in the selectivity curve of the receiver, the sound converter 16 generates the intercarrier frequency of 4.5 MC. This intercarrier frequency signal is applied via capacitor network 21, 22 to coupled tuned circuits 23, 24, which are comparatively sharply tuned to the intercarrier frequency.

The output of tuned circuit 24 is rectified by a diode 25, and the resulting DC and low frequency components are applied to a transistor 26 across an RC circuit 27. The time constant of RC circuit is sufficiently short to permit a signal at the horizontal sync frequency (i.e., 15.75 Kc) to be present at the control electrode of transistor 26 together with the DC component, if such a horizontal sync frequency is present in the signal developed across tuned circuit 24. This aspect of the invention will be discussed more fully hereinafter.

Under normal operating conditions, and more particularly under the conditions which correspond to reception of picture carrier and sound carrier signals properly spaced from one another by the intercarrier frequency, the only modulation which will appear on the 4.5 MC signal across tuned circuits 23, 24 will be the FM audio. This modulation will, however, have substantially no effect on the operation of the circuit since the bandwidth of coupled circuits 23, 24 is broad enough so that a moderate variation of frequency will not materially affect the amplitude of the signal across circuit 24. More particularly, in order to render the overall circuit comparatively invulnerable to noise pick-up, coupled circuits 23, 24 have a fairly narrow bandwidth; while they are broad enough not to demodulate the FM appearing on the 4.5 MC signal, they need not be broader than 20–30 Kc which, in the television band, is comparatively narrow. Accordingly, notwithstanding the possible presence of FM audio modulation on the signal across tuned circuits 23, 24, the amplitude of the 4.5 MC signal will remain substantially constant regardless of where the receiver is tuned, within reason.

Transistor 26 operates, in response to generation of the intercarrier frequency signal across circuits 23,24, to provide an output which is applied, at a potential positive to ground, via resistor 29 to a capacitor 30. The potential across capacitor 30 thus acts as a control signal which appears on line 31; and the maximum value of that control signal can be in turn determined by a diode limiter 32 connected thereto. The signal appearing on line 31 is used to control the operation of controllable coupling circuits 14, 18, and is further used to control a signal seeker 33, 33*a* which may, for example, be mechanically coupled as at 34 to television tuner 11.

As described in further detial in my prior U.S. Pat. No. 3,686,430, incorporated herein by reference, transistors 14 and 18 (or other appropriate circuits performing their function) act as controllable coupling networks which, in the absence of a proper signal from transistor 26, mute the picture and sound channels of the receiver. When an appropriate control signal appears on line 31, transistors 14 and 18 amplify the video and audio frequency components and supply signals to utilization circuits 15 and audio frequency amplifier 19 so that the receiver may operate in normal fashion. As a result of this aspect of the operation, therefore, the audio and video portions of the receiver are disabled over the entire tuning band except at points of correct tuning. This same control signal is, moreover, applied to a signal seeker driver stage 33 and used to control signal seeker 33*a*, i.e., once the signal seeker is rendered operative by momentary depression of an appropriate start switch (not shown) it will continuously vary the tuning of the receiver over a predetermined television frequency spectrum until an appropriate control signal appears on line 31, at which time further operation of signal seeker 33*a* will be interrupted to stop further tuning. Control of both the muting operation and signal seeker operation is, therefore, dependent upon the generation of an appropriate 4.5 megacycle signal across tuned circuits 23, 24; and various other frequencies that may be picked up by the receiver during the tuning operation will not generate the 4.5 megacycle intercarrier signal and accordingly will not affect either the muting or signal seeker operations.

During the continuous tuning by the signal seeker 33*a*, there will, however, be points where the image frequency will generate a 4.5 megacycle signal across tuned circuits 23, 24 due to image frequency heterodyning. The circuit of FIG. 1 includes an image frequency rejection circuit which distinguishes between such image frequencies and proper signal reception, and which functions to eliminate the generation of an operative control signal on line 31 when the 4.5 megacycle signal across tuned circuits 23, 24 has resulted from image frequency heterodyning. In order that the principles behind this portion of the circuit operation can be more readily understood, reference will first be made to FIG. 2.

For purposes of illustration, it has been assumed that the received video carrier has a frequency of 200 MC, and that the associated sound carrier signal has a frequency of 204.5 MC. The continuously tuned heterodyne oscillator is set at 245.75 MC during correct signal reception. Under these conditions of operation, represented by the right-hand portion of FIG. 2 designated A, the heterodyning operation will produce an IF sound signal of 41.25 MC, and a video IF signal of 45.75 MC. As mentioned previously, the IF sound signal will carry FM audio modulation thereon, whereas the IF video signal will carry an amplitude modulation which is primarily video frequencies plus the horizontal and vertical sync signal frequencies. Under normal operating conditions, the amplitude modulation of the picture carrier is substantially eliminated from the 4.5 MC output appearing across tuned circuit 24 due to the fact that it is very much greater in amplitude than the FM sound carrier and therefore, under proper signal reception conditions, no significant signal at a frequency of 15.75 Kc (the sync frequency) will be coupled via diode 25 to RC circuit 27 and to the input electrode of transistor 26.

When the local oscillator of the receiver is set at 158.75 MC, however, and assuming the same video carrier and sound carrier frequencies as have been postulated above, image frequency heterodyning will produce a video IF signal at a frequency of 41.25 MC, and a sound IF signal at a frequency of 45.75 MC. This image frequency heterodyning condition of operation is depicted at the left-hand side of FIG. 2 at B and is manifested by operating conditions wherein the relative positions of the video and FM IF signal frequencies are reversed. Such as reversal in the position of the relative frequencies on the selectivity curve of the IF amplifier 12 will make the video IF smaller and the sound IF carrier greater in amplitude than they were under normal operating conditions, and the 4.5 MC signal generated across tuned circuits 23, 24 will accordingly carry a very pronounced amplitude modulation at the horizontal sync frequency, i.e., at a frequency which is mainly 15.75 Kc. Thus, by monitoring the modulation which is present on the 4.5 MC signal at circuits 23, 24 a determination may readily be made as to whether that intercarrier signal has been produced by proper reception or whether it has been produced by image frequency heterodyning within the receiver during the continuous tuning operataion effected by signal seeker 33*a*.

In the particular circuit arrangement shown in FIG. 1, the parameter which is being monitored is the amplitude modulation of the 4.5 MC signal appearing across tuned circuit 24. Any amplitude modulation on the intercarrier signal is derived from the collector of transistor 26 by use of the signal which has already been demodulated by diode 25 and amplified by transistor 26. This signal, which consists mostly of video components, is applied to the base of transistor 36 through capacitor 35. Transistor 36 is biased near collector current cut off. When any signal reaches its base, the collector current of transistor 36 increases due to the fact that a positive pulse on the base of that transistor will have a greater effect than a negative pulse. Such an increase in collector current lowers the potential between the collector of transistor 36 and ground, resulting in a lowered voltage across capacitor 30 due to the connection of capacitor 30 to the collector electrode of transistor 36 through resistor 37. In short, when an amplitude modulated intercarrier signal appears, the DC potentials supplied by transistors 26 and 36 have opposite effects across capacitor 30. Consequently, transistors 14, 18 and 33 do not begin functioning until a 4.5 MC signal which is free of amplitude modulation reaches tuned circuits 23 and 24.

In order for transistors 14, 18 and 33 to receive a negative or at least zero potential on their control electrodes, it is necessary that their emitters be slightly above ground potential. This is accomplished by resistor/capacitor combinations 71 which permanently raise the emitters of said transistors above ground.

Inasmuch as the received signals may vary greatly in amplitude, and since the automatic gain control of the receiver does not completely compensate for this, the voltage applied to capacitor 30 is made greater than necessary for proper operation. To regulate this voltage, potentiometer 40 together with diode limiter 32 act to limit the amplitude of the control signal across capacitor 30, while diodes 41 and 42 prevent any mixing of the audio and video signals. Biasing resistors 35*a* and 36*a* are used to adjust the range of operation of transistors 26 and 36. These resistors are adjusted at low signal inputs while diode 32 takes care of greater inputs. A low pass filter composed of resistor 37 and capacitor 30 eliminates any remaining video frequency from the output of transistor 36.

The form of the invention shown in FIG. 1 consists of two main circuits. The first of these circuits is associated with transistor 26 to pick up and convert the 4.5 MC intercarrier frequency signal to a DC signal to notify the signal seeking equipment when correct tuning to a television signal has been accomplished. The other is the circuit associated with transistor 36 which operates mainly when tuning results in generation of the image frequency. In the latter case, as described, the 4.5 MC intercarrier frequency is modulated by some of the video frequencies and these are rectified and fed in opposition to the output of the first circuit, resulting in cancellation of the DC output signal.

Figure 3:
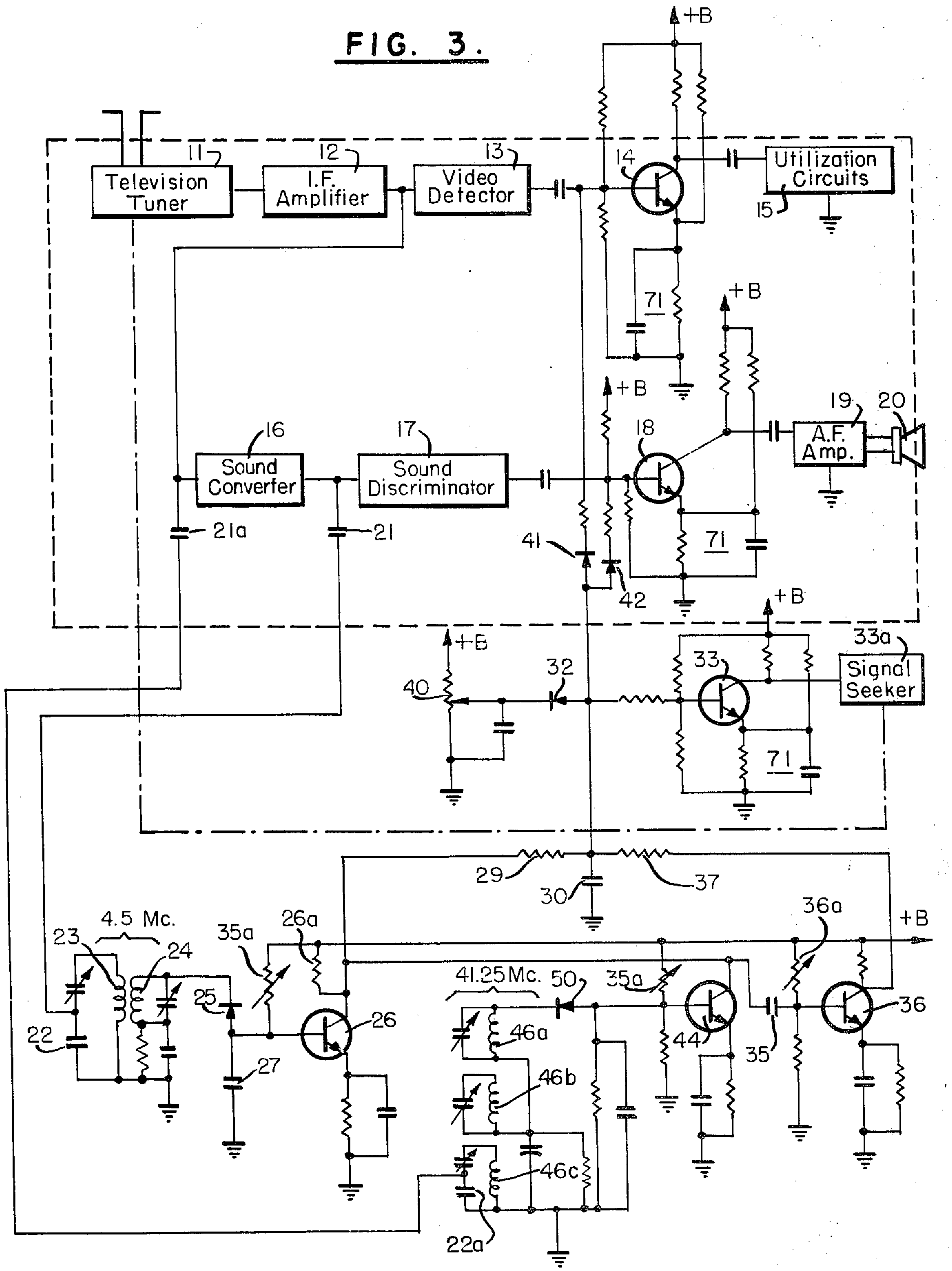
FIG. 3 is a circuit diagram of a modified form of the invention.

An alternate form of the invention is shown in FIG. 3. In this alternate form, the 41.25 MC sound IF carrier is added to the 4.5 MC intercarrier frequency to serve two purposes, i.e., (1) to add one more point of identification to the television signal, and (2) to define with a higher degree of accuracy the point of correct tuning.

The FIG. 3 form of the invention, in addition to employing everything shown in FIG. 2, includes another transistor 44. The circuit of transistor 44 is similar to that of transistor 26, but its input is derived from the sound IF frequency of 41.25 MC. This signal is obtained through capacitor 21*a* from the output of video IF amplifier 12 and feeds a tuned circuit 46*c* through capacitor 22*a*. In order to gain a high degree of selectivity, three such tuned circuits 46*a*, 46*b* and 46*c* are connected to one another and used together to select the 41.25 MC frequency modulated sound IF carrier. The voltage across tuned circuit 46*a* is applied via diode 50 to the base of transistor 44. The output electrode of transistor 26. Therefore, these two transistors will act together on the load resistor 26*a*. The final result is that both transistors 26 and 44 must receive the proper signal to raise the voltage at capacitor 30. This provides an additional safeguard against the circuit acting on some spurious signal.

While I have thus described preferred embodiments of the present invention, many variations will be apparent to those skilled in the art. It must therefore be understood that the foregoing description is intended to be illustrative only and not limitative of the present invention, and all such variations as are in accord with the principles described are meant to fall within the scope of the appended claims.

Having thus described my invention, I claim:

1. In an intercarrier television receiver, tunable signal translating means responsive to received picture carrier and sound carrier signals to produce picture IF, sound IF, and intercarrier frequency signals, said tunable signal translating means having a signal seeker coupled thereto for continuously varying the tuning of said receiver over a predetermined television frequency spectrum, control means coupled to said signal seeker for selectively interrupting the operation of said signal seeker at points of correct tuning in said spectrum, a control circuit including tuned circuit means coupled to said signal translating means and tuned to the intercarrier frequency for generating a control signal in response to the production of a beat frequency between the picture and sound carrier signals at said intercarrier frequency, said control means being operatively responsive to generation of said control signal to selectively interrupt the operation of said signal seeker, and means for monitoring the presence and absence of amplitude modulation on said intercarrier frequency signal to determine whether said control signal has been produced by the reception by said receiver of picture carrier and sound carrier signals spaced from one another by said intercarrier frequency or whether said control signal has been produced by image frequency heterodyning within said receiver during said continuous tuning operation, said last-named means being responsive to the presence of said amplitude modulation on said intercarrier frequency signal, indicative of a reversal of the normal comparative frequencies of said video IF and sound IF signals, for rendering said control signal inoperative to interrupt the operation of said signal seeker.

2. The combination of claim 1 wherein said tuned circuit means is coupled via rectifier means to an RC circuit having a time constant which permits a signal at the sync frequency to be developed across said RC circuit when said intercarrier frequency has amplitude modulation at said sync frequency thereon, said monitoring means including means responsive to the generation of a signal across said RC circuit for permitting continued operation of said signal seeker.

3. The combination of claim 2 wherein said signal translating means includes a sound converter operative to generate said intercarrier frequency signal, said tuned circuit means being capacitively coupled to the output of said sound converter.

4. The combination of claim 1 wherein said tuned circuit means is coupled to the intercarrier sound system of said receiver whereby said tuned circuit means is operative to produce a frequency modulated intercarrier frequency signal having no significant amplitude modulation thereon upon reception by said receiver of properly spaced picture carrier and sound carrier signals, and is operative to produce an intercarrier frequency signal having amplitude modulation thereon at the horizontal sync frequency upon occurrence of image frequency heterodyning within said receiver, said control means being selectively responsive to the presence of said amplitude modulation on said intercarrier frequency signal for permitting continued operation of said signal seeker.

5. The combination of claim 4 wherein said control circuit includes means for rectifying the intercarrier signal across said tuned circuit means to produce a DC control signal of predetermined polarity which is normally operative to interrupt the operation of said signal seeker, said monitoring means being responsive to the presence of said amplitude modulation on said intercarrier signal to generate a further DC signal in polarity opposition to said DC control signal.

6. The combination of claim 5 including first transistor means coupling said rectifying means to a capacitor to generate said DC control signal in said predetermined polarity across said capacitor, second transistor means coupled to said first transistor means and responsive to the presence of said amplitude modulation for generating said opposing polarity signal across said capacitor, and means coupling said capacitor to said control means whereby the resultant signal across said capacitor controls said signal seeker.

7. The combination of claim 1 wherein said signal translating means includes an IF amplifier the output of which is coupled to the input of a sound converter, said tuned circuit means being coupled to the output of said sound converter whereby said tuned circuit means is operative to produce a frequency modulated AC signal at said intercarrier frequency upon reception of a proper signal by said receiver, said control circuit including means responsive to said frequency modulated AC signal for producing a DC signal of predetermined polarity constituting said control signal, further tuned circuit means tuned to a frequency different from said first-mentioned tuned circuit menas, said further tuned circuit means being coupled to the output of said IF amplifier, and means responsive to the generation of an amplitude modulated signal, at the frequency of said further tuned circuit means, across said further tuned circuit means for rendering said control signal ineffective to interrupt the operation of said signal seeker.

8. The combination of claim 1 wherein said receiver includes picture producing means and sound producing means, and further control means for muting said picture producing means and said sound producing means when said signal seeker is in operation, said further control means being responsive to generation of said control signal for discontinuing said muting operation coincident with interruption of the operation of said signal seeker.

9. The combination of claim 8 wherein said receiver includes means responsive to said IF signals for producing video and sound signals, transistor coupling means for selectively coupling said video signals to said picture producing means, further transistor coupling means for selectively coupling said sound signals to said sound producing means, and means coupling said control signal to each said transistor coupling means for controlling their signal coupling operations.

10. The combination of claim 9 including limiter means for controlling the magnitude of the control signal which is coupled to said transistor coupling means.

11. The combination of claim 1 wherein said monitoring means includes means for rendering said control signal inoperative by varying the amplitude of said control signal.

12. An intercarrier television receiver comprising tunable signal translating means responsive to correct reception of a television transmission for producing picture IF and sound IF signals having frequencies spaced from one another by an intercarrier frequency, a signal seeker coupled to said tunable signal translating means for continuously varying the tuning of said receiver over a predetermined television frequency spectrum, said receiver including a tuned circuit tuned to said intercarrier frequency, a first control circuit coupled to said tuned circuit and responsive to the production of a signal at said intercarrier frequency across said tuned circuit without any significant amplitude modulation thereon for generating a control signal effective to interrupt the tuning operation of said signal seeker, and a second control circuit responsive to the presence of a predetermined amplitude modulation on the intercarrier frequency signal across said tuned circuit for rendering said control signal ineffective to interrupt the tuning operation of said signal seeker.

13. The receiver of claim 12 wherein said first control circuit includes rectifier means for producing a first DC signal of predetermined polarity comprising said control signal, said second control circuit including means responsive to said amplitude modulation for producing a second DC signal in polarity opposition to said first DC signal operative to effectively nullify said control signal.

14. The receiver of claim 13 wherein said amplitude modulation comprises modulation at the horizontal sync frequency on the intercarrier frequency signal produced across said tuned circuit.

15. The receiver of claim 12 wherein said receiver includes an IF amplifier, said second control circuit including a further tuned circuit coupled to the output of said IF amplifier and tuned to the frequency of said sound IF signal.

16. The receiver of claim 13 wherein said second control circuit includes means responsive to amplitude modulation on the sound IF signal produced by said tunable signal translating means during said tuning operation for supplementing said second DC signal.

* * * * *